United States Patent
Perron et al.

(10) Patent No.: US 10,825,165 B2
(45) Date of Patent: Nov. 3, 2020

(54) INSPECTION METHOD FOR A MANUFACTURED ARTICLE AND SYSTEM FOR PERFORMING SAME

(71) Applicant: LYNX INSPECTION INC., Québec (CA)

(72) Inventors: Luc Perron, Québec (CA); Dominique Boutet, Québec (CA); Steve Godbout, L'Ancienne-Lorette (CA)

( * ) Notice: Subject to any disclaimer, the term of this patent is extended or adjusted under 35 U.S.C. 154(b) by 58 days.

(21) Appl. No.: 16/319,680

(22) PCT Filed: Jul. 21, 2017

(86) PCT No.: PCT/CA2017/050882
§ 371 (c)(1),
(2) Date: Jan. 22, 2019

(87) PCT Pub. No.: WO2018/014138
PCT Pub. Date: Jan. 25, 2018

(65) Prior Publication Data
US 2020/0184617 A1  Jun. 11, 2020

Related U.S. Application Data

(60) Provisional application No. 62/365,657, filed on Jul. 22, 2016.

(51) Int. Cl.
*G06K 9/00* (2006.01)
*G06T 7/00* (2017.01)
(Continued)

(52) U.S. Cl.
CPC .............. *G06T 7/001* (2013.01); *G01B 15/04* (2013.01); *G06T 7/0006* (2013.01); *G06T 19/20* (2013.01);
(Continued)

(58) Field of Classification Search
CPC ....... G06T 7/001; G06T 7/0006; G06T 19/20; G06T 2207/10016; G06T 2207/10081;
(Continued)

(56) References Cited

U.S. PATENT DOCUMENTS 5,857,032 A * 1/1999 Wang .................. G06T 7/001
345/419
7,092,484 B1  8/2006 Jensen et al.
(Continued)

FOREIGN PATENT DOCUMENTS

CA         2821682 A1    4/2012

OTHER PUBLICATIONS

Colbert Lu et al., "AIMS-fab SPEC for Defect Repair and Better Repar Profile", 24th Annual BACUS Symposium on Photomask Technology, Proceedings of SPIE, 2004, vol. 5567, pp. 1024-1034.

*Primary Examiner* — Samir A Ahmed
(74) *Attorney, Agent, or Firm* — Polsinelli PC

(57) ABSTRACT

A method for performing inspection of a manufactured article. The method comprises acquiring a sequence of radiographic images of the article; determining a position of the article for each one of the acquired radiographic images; and performing a three-dimensional model correction loop which comprises, iteratively: generating a simulated radiographic image for each determined position of the article; and comparing the simulated radiographic images and the acquired radiographic images and generating a match result. If the match result is indicative of a mismatch, the method includes identifying and characterizing differences between the simulated radiographic images and the acquired radiographic images; correcting one of a geometry and a material density of a region of interest of the detailed three-dimensional model of the article based on each one of the identified and characterized differences; and performing a (Continued)

new iteration. A system for performing inspection is also provided.

24 Claims, 4 Drawing Sheets

(51) Int. Cl.
*G01B 15/04* (2006.01)
*G06T 19/20* (2011.01)

(52) U.S. Cl.
CPC ......... *G06T 2207/10016* (2013.01); *G06T 2207/10081* (2013.01); *G06T 2219/2004* (2013.01)

(58) Field of Classification Search
CPC ... G06T 2219/2004; G06T 7/38; G01B 15/04; G01B 15/00; G01N 2223/305; G01N 2223/3308; G01N 2223/646; G01N 23/044; B07C 5/34
See application file for complete search history.

(56) References Cited

U.S. PATENT DOCUMENTS

| | | | |
|---|---|---|---|
| 7,570,796 B2 | 8/2009 | Zafar et al. | |
| 7,646,906 B2 | 1/2010 | Saidin et al. | |
| 8,993,914 B2 | 3/2015 | Kujacznski et al. | |
| 9,087,367 B2 | 7/2015 | Chang et al. | |
| 9,098,891 B2 | 8/2015 | Kulkarni et al. | |
| 9,098,894 B2 | 8/2015 | Kuo et al. | |
| 9,129,715 B2 | 9/2015 | Adler et al. | |
| 9,311,698 B2 | 4/2016 | Chu et al. | |
| 9,401,016 B2 | 7/2016 | Kulkarni | |
| 9,423,250 B1* | 8/2016 | Troy | G01C 25/005 |
| 9,478,019 B2 | 10/2016 | Sezginer et al. | |
| 2008/0247636 A1* | 10/2008 | Davis | G06T 19/00 382/152 |
| 2009/0307628 A1* | 12/2009 | Metala | G06T 19/00 715/782 |
| 2010/0220910 A1 | 9/2010 | Kaucik et al. | |
| 2011/0261190 A1 | 10/2011 | Nakagaki et al. | |
| 2012/0082354 A1* | 4/2012 | Peters | G06T 7/60 382/128 |
| 2014/0204702 A1* | 7/2014 | Ratering | G01S 7/52073 367/8 |
| 2014/0282624 A1 | 9/2014 | Holt et al. | |
| 2015/0346115 A1 | 12/2015 | Seibel et al. | |
| 2016/0195390 A1 | 7/2016 | Nissen et al. | |
| 2016/0224017 A1* | 8/2016 | Huang | G01N 21/9515 |
| 2017/0003230 A1 | 1/2017 | Park et al. | |

* cited by examiner

INSPECTION METHOD FOR A MANUFACTURED ARTICLE AND SYSTEM FOR PERFORMING SAME

TECHNICAL FIELD OF THE INVENTION

The present invention relates to the field of industrial inspection. More particularly, it relates to a method for performing industrial inspection and/or non destructive testing (NDT) of a manufactured article and to a system for performing the industrial inspection and/or NDT of a manufactured article.

BACKGROUND

Numerous inspection methods and systems are known in the art for performing industrial inspection and/or Non-Destructive Testing (NDT) of manufactured articles. In many cases, machine vision applications can be solved using basic image processing tools that analyze the content of acquired 2D imagery. However, in recent years new applications performing 3D analysis of the data are getting more popular, given their additional inspection capabilities.

With regards to industrial inspection, one of the essential requirements is the ability to measure the dimensions of an article against specifications for this particular article or against a standard thereof, which can be referred to as "Industrial Metrology". On the other hand, NDT refers to a wider range of application and also extends to the inspection of the inner portion of the article, for detection of subsurface defects.

Common industrial metrology tools include optical devices (i.e. optical scanners) capable of performing accurate measurements of control points and/or complete 3D surface scan of a manufactured object. Such optical scanners can be hand operated or mounted on a robotic articulated arm to perform fully automated measurements on an assembly line. Such devices however tend to suffer from several drawbacks. For example, the inspection time is often long as a complete scan of a manufactured article can take several minutes to complete, especially if the shape of the article is complex. Moreover, optical devices can only scan the visible surface of an object, thereby preventing the use of such devices for the metrology of features that are inaccessible to the scanner or the detection of subsurface defects. Hence, while such devices can be used for industrial metrology, their use is limited to such a field and cannot be extended to wider NDT applications.

One alternative device for performing industrial metrology is Computed Tomography (CT), where a plurality of X-ray images is taken from different angles and computer-processed to produce cross-sectional tomographic images of a manufactured article. CT however also suffers from several drawbacks. For example, conventional CT methods require a 360° access around the manufactured article which can be achieved by rotating the sensor array around the article or by rotating the object in front of the sensor array. However, rotating the manufactured article limits the size of the article which can be inspected and imposes some restrictions on the positioning of the object, especially for relatively flat objects. Moreover, CT reconstruction is a fairly computer intensive application (which normally requires some specialized processing hardware), requiring fairly long scanning and reconstruction time. For example, a high resolution CT scan in the context of industrial inspection typically requires more than 30 minutes for completion followed by several more minutes of post processing. Faster CT reconstruction methods do exist, but normally result in lower quality and measurement accuracy, which is undesirable in the field of industrial inspection. Therefore, use of CT is unadapted to high volume production, such as volumes of 100 articles per hour or more. Finally, CT equipment is generally costly, even for the most basic industrial CT equipment.

With regards to general NDT, non-tomographic industrial radiography (e.g. film-based, computed or digital radiography) can be used for inspecting materials in order to detect hidden flaws. These traditional methods however also tend to suffer from several drawbacks. For example, defect detection is highly dependent on the orientation of such defects in relation to the projection angle of the X-ray (or gamma ray) image. Consequently, defects such as delamination and planar cracks, for example, tend to be difficult to detect using conventional radiography. As a result, alternative NDT methods are often preferred to radiography, even if such methods are more time consuming and/or do not necessarily allow assessing the full extent of a defect and/or do not necessarily allow locating the defect with precision.

In view of the above, there is a need for an improved method for performing inspection of a manufactured article and for a system for performing the same, which would be able to overcome or at least minimize some of the above-discussed prior art concerns.

BRIEF SUMMARY OF THE INVENTION

According to a first general aspect, there is provided a method for performing inspection of a manufactured article defined by a detailed three-dimensional model.
The method comprises:
  acquiring a sequence of radiographic images of the article using a radiographic image acquisition device including at least one sensor array, the acquisition of the sequence of radiographic images being performed as relative movement occurs between the article and the radiographic image acquisition device;
  performing registration of the article in 3D space relative to the radiographic image acquisition device for each one of the acquired radiographic images; and
  performing a three-dimensional model correction loop comprising, iteratively:
    generating a simulated radiographic image for each radiographic image acquired and corresponding to a registration of the article in a 3D space, generation of the simulated radiographic images being performed by ray casting through the detailed three-dimensional model to define the optical path of each pixel of the at least one sensor array;
    comparing the simulated radiographic images and the acquired radiographic images and generating a match result indicative of whether the simulated radiographic images and the acquired radiographic images are a match or a mismatch;
    if the match result is indicative of a mismatch,
      performing imagery analysis of the simulated radiographic images and the acquired radiographic images to identify and characterize differences between the simulated radiographic images and the acquired radiographic images; and
      correcting one of a geometry and a material density of a region of interest of the detailed three-dimensional model of the article based on each one of the identified and characterized differences; and performing a new iteration of the three-dimensional model correction loop until a final detailed three-dimensional model is obtained.

In an embodiment, the method further comprises performing at least one of a metrology assessment and a subsurface defect detection performed using the detailed three-dimensional model. The metrology assessment generates metrology assessment data and the subsurface defect detection generates subsurface defect detection data.

In an embodiment, the method further comprises performing at least one of data visualization and article sorting based on at least one of the metrology assessment data and the subsurface defect detection data.

In an embodiment, the manufactured article is originally defined by a theoretical detailed three-dimensional model and the step of performing the three-dimensional model correction loop comprises, if the match result is indicative of a match, generating the final detailed three-dimensional model corresponding to an actual detailed three-dimensional model and conform to the geometric dimensions of the manufactured article. The step of performing the metrology assessment comprises comparing the theoretical detailed three-dimensional model and the final detailed three-dimensional model.

In an embodiment, the method further comprises acquiring surface profile data for the article using a surface profile acquisition device, the acquisition of the surface profile data being performed as relative movement occurs between the article and the surface profile acquisition device.

In an embodiment, the step of performing registration of the article in 3D space for each one of the acquired radiographic images of the article comprises analysing the acquired surface profile data and positioning the article using the analysed surface profile data.

In an embodiment, the method further comprises correcting the detailed three-dimensional model using the acquired surface profile data.

In an embodiment, the step of acquiring radiographic images of the article using a radiographic image acquisition device includes acquiring at least about 25 radiographic images defining a continuous sequence of images, with each image providing a unique viewing angle of the article.

In an embodiment, the step of acquiring radiographic images of the article using a radiographic image acquisition device includes acquiring at least about 100 radiographic images defining a continuous sequence of images, with each image providing a unique viewing angle of the article.

In an embodiment, the step of performing imagery analysis of the simulated radiographic images and the acquired radiographic images to identify and characterize differences between the simulated radiographic images and the acquired radiographic images comprises using feature tracking from one image to another to locate each of the differences in 3D space.

In accordance with another general aspect, there is also provided a method for performing inspection of a manufactured article defined by a detailed three-dimensional model. The method comprises:

acquiring a sequence of radiographic images of the article using a radiographic image acquisition device comprising at least one sensor array, the acquisition of the sequence of radiographic images being performed as relative movement occurs between the article and the radiographic image acquisition device;

performing registration of the article in 3D space relative to the radiographic image acquisition device for each one of the acquired radiographic images;

generating a simulated radiographic image for each radiographic image acquired and corresponding to a registration of the article in a 3D space, generation of the simulated radiographic images being performed by ray casting through the detailed three-dimensional model to define the optical path of each pixel of the at least one sensor array;

comparing the simulated radiographic images and the acquired radiographic images and generating a match result indicative of whether the simulated radiographic images and the acquired radiographic images are a match or a mismatch and performing a three-dimensional model correction loop comprising, until the match result is indicative of a match, iteratively:

performing imagery analysis of the simulated radiographic images and the acquired radiographic images to identify and characterize differences between the simulated radiographic images and the acquired radiographic images; and correcting one of a geometry and a material density of a region of interest of the detailed three-dimensional model of the article based on each one of the identified and characterized differences and generating a corrected detailed three-dimensional model;

generating a new simulated radiographic image for each radiographic image acquired and corresponding to a registration of the article in a 3D space determined position of the article relative to the radiographic image acquisition device corresponding to one of the acquired radiographic images, generation of the simulated radiographic images being performed by ray casting through the corrected detailed three-dimensional model of the article to define the optical path of each pixel of the at least one sensor array; and comparing the new simulated radiographic images and the acquired radiographic images and generating the match result indicative of whether the new simulated radiographic images and the acquired radiographic images are a match or a mismatch.

performing at least one of a metrology assessment and a subsurface defect detection based on the image comparison data, the metrology assessment generating metrology assessment data and the subsurface defect detection generating subsurface defect detection data.

In an embodiment, the manufactured article is originally defined by a theoretical detailed three-dimensional model and the step of performing the three-dimensional model correction loop comprises, once the match result is indicative of a match, generating a final detailed three-dimensional model corresponding to a last corrected detailed three-dimensional model and conform to the geometric dimensions of the manufactured article. Performing the metrology assessment comprises comparing the theoretical detailed three-dimensional model and the final detailed three-dimensional model.

In an embodiment, the method further comprises the step of acquiring surface profile data for the article using a surface profile acquisition device, the acquisition of the surface profile data being performed as relative movement occurs between the article and the surface profile acquisition device.

In an embodiment, the step of determining a position of the article for each one of the acquired radiographic images of the article comprises analysing the acquired surface profile data and positioning the article based on the analysed surface profile data.

In an embodiment, the method further comprises correcting the detailed three-dimensional model using the acquired surface profile data.

In an embodiment, the method further comprises performing at least one of data visualization and article sorting based on at least one of the metrology assessment data and the subsurface defect detection data.

In an embodiment, the step of acquiring radiographic images of the article using a radiographic image acquisition device includes acquiring at least about 25 radiographic images defining a continuous sequence of images, with each image providing a unique viewing angle of the article.

In an embodiment, the step of acquiring radiographic images of the article using a radiographic image acquisition device includes acquiring at least about 100 radiographic images defining a continuous sequence of images, with each image providing a unique viewing angle of the article.

In an embodiment, the step of performing imagery analysis of the simulated radiographic images and the acquired radiographic images to identify and characterize differences between the simulated radiographic images and the acquired radiographic images comprises using feature tracking from one image to another to locate each of the differences in 3D space.

In accordance with another general aspect, there is further provide a system for performing inspection of a manufactured article defined by detailed three-dimensional model data. The system comprises:
- a radiographic image acquisition device acquiring a sequence of radiographic images of the article as relative movement occurs between the radiographic image acquisition device and the manufactured article, the radiographic image acquisition device comprising at least one sensor array;
- a motion device operatively connected to one of the manufactured article and the radiographic image acquisition device and generating the relative movement between the manufactured article and the radiographic image acquisition device;
- a positional evaluation unit in data communication with the radiographic image acquisition device and receiving the acquired radiographic images therefrom, the positional evaluation unit being configured to perform image processing of the received radiographic images and generating article position data representative of the position of the article relative to the radiographic image acquisition device for each one of the acquired radiographic images;
- a three-dimensional model correction unit in data communication with the radiographic image acquisition device and the positional evaluation unit and receiving the acquired radiographic images and article position data therefrom, the three-dimensional model correction unit comprising:
  - a radiographic image simulator configured to simulate a path of the radiation rays of the radiographic image acquisition device through the manufactured article using ray casting through the detailed three-dimensional model represented by the detailed three-dimensional model data to define the optical path of each pixel of the at least one sensor array, based on the position data representative of the position of the article relative to the radiographic image acquisition device for each radiographic image acquired by the radiographic image acquisition device, and to generate simulated radiographic images therefrom;
  - an image compare unit configured to compare the simulated radiographic images and the acquired radiographic images and to generate a match result indicative of whether the simulated radiographic images and the acquired radiographic images are a match or a mismatch;
  - a three-dimensional model update unit configured to, upon detection of the match result being a mismatch, perform imagery analysis of the simulated radiographic images and the acquired radiographic images to identify and characterize differences between the simulated radiographic images and the acquired radiographic images and correct one of a geometry and a material density of the detailed three-dimensional model data, the three-dimensional model update unit generating updated detailed three-dimensional model data representative of a corrected three-dimensional model of the article matching the manufactured article;
- at least one of a metrology assessment unit and a subsurface defect detection unit in data communication with the three-dimensional model correction unit and receiving the detailed three-dimensional model data therefrom, the at least one of the metrology assessment unit and the subsurface defect detection unit being configured to process the received data and generating article inspection data therefrom.

In an embodiment, the system further comprises a data display device in data communication with the at least one of the metrology assessment unit and the subsurface defect detection unit and displaying the article inspection data.

In an embodiment, the system further comprises an article sorting unit in data communication with the at least one of the metrology assessment unit and the subsurface defect detection unit and configured to process the article inspection data and sort the article based on the processed article inspection data.

In an embodiment, the radiographic image acquisition device includes at least one X-ray source and at least one corresponding X-ray sensor.

In an embodiment, the system further comprises a surface scanner acquiring a surface profile of the article as relative movement occurs between the article and the surface scanner.

The proposed method for performing inspection of a manufactured article and the system for performing the same provide a cost-efficient inspection solution, which can automatically make precise 3D measurements on articles at very high speed (e.g. from a few seconds per articles for highly complex articles to speeds exceeding 100 articles per minute for articles having a simple geometry). The proposed method for performing inspection of a manufactured article and the system for performing the same also provide the means to inspect the internal structure of these articles and therefore detect subsurface defects, therefore allowing the system and method to be used to perform NDT.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the method for performing inspection of a manufactured article and the system for performing the same consist of certain elements as explained and illustrated herein, not all of these elements are essential and thus should not be taken in their restrictive sense. It is to be understood, as also apparent to a person skilled in the art, that other suitable elements and cooperation thereinbetween may be used for the method for performing inspection of a manufactured article and the system for performing the same, as will be briefly explained herein and as can be easily inferred herefrom by a person skilled in the art.

In general terms, the method for performing inspection of a manufactured article and the system for performing the same uses previously known data relating to the article being inspected (required measurements, material of the article, etc.) and the configuration of a radiographic image acquisition device in order to perform precise measurement (i.e. metrology analysis) and/or subsurface defect detection of a plurality of the articles, sequentially. It will be understood that the method allows inspection of numerous types of manufactured articles, from diverse fields, such as, without being limitative, glass bottle, plastic molded components, die casting parts, additive manufacturing components, wheels, tires and other manufactured of refactored parts for the automotive, military or aerospace industry. The above examples are given as indicator only and one skilled in the art will understand that several other types of manufactured articles can be subjected to inspection using the present method. In an embodiment, the articles are sized and shaped to be conveyed on a motion device for inline inspection thereof. In an alternative embodiment, the article can be a large article, which is difficult to displace, such that components of the inspection system should rather be displaced relative to the article.

Figure 1:
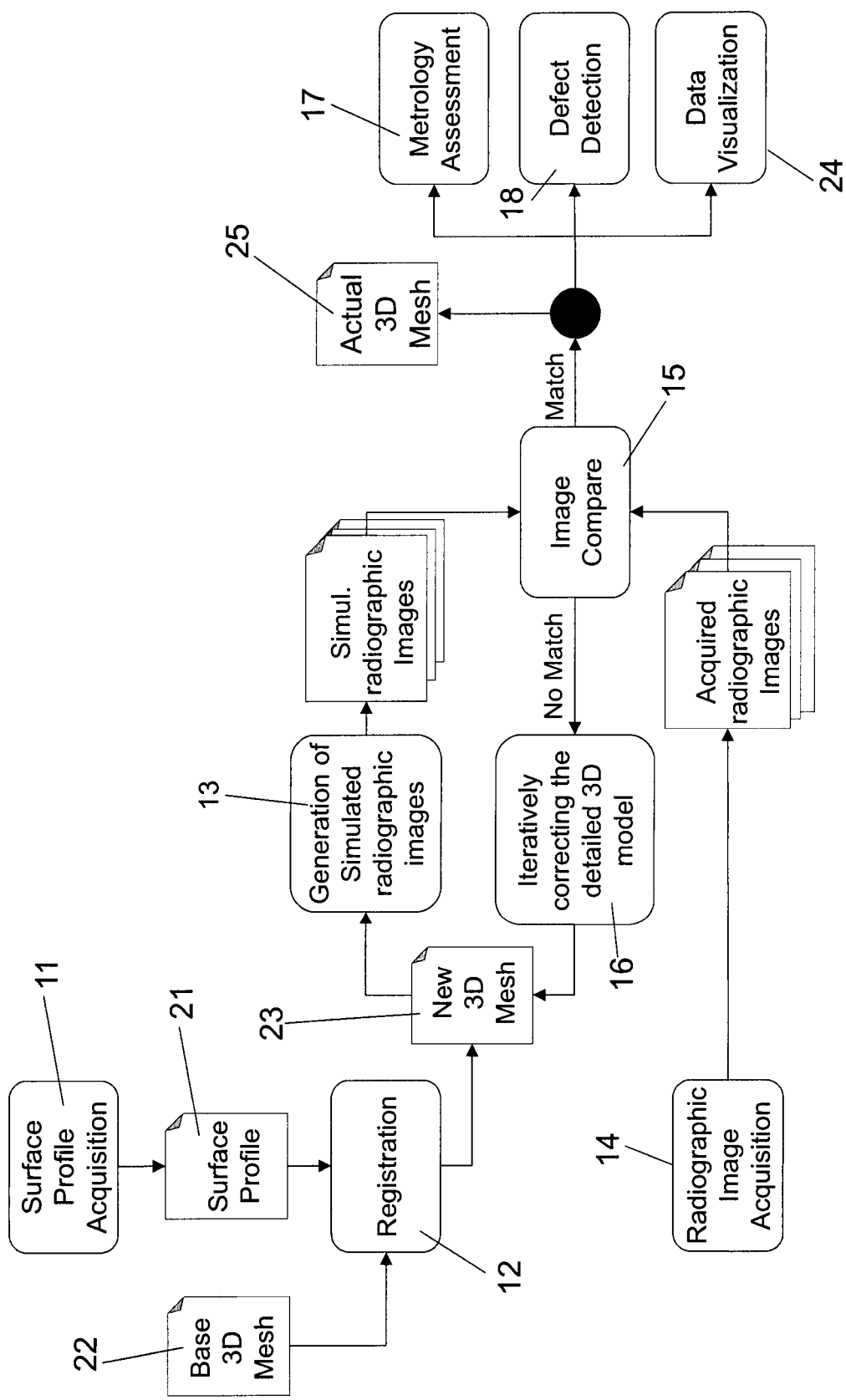
FIG. 1 is a schematic representation of the method for performing inspection of a manufactured article, in accordance with an embodiment.

Referring generally to FIG. 1, an embodiment of the method 10 for performing inspection of a manufactured article is shown. As mentioned above, this method can be performed for articles (or region of interest thereof) where the precise geometry and dimensional characteristics are known, as represented by a theoretical detailed three-dimensional (3D) model (base 3D Mesh) 22 of the article and where the article (or region of interest thereof) is made of a known material. The theoretical detailed 3D model (base 3D Mesh) 22 of the article can be acquired from multiple different sources such as, without being limitative, a Computer-aided Design (CAD) of the article, a CT scan of the object or any other means that can produce such mesh.

In an embodiment, the article (or region of interest thereof) can be made of more than one known material with known positioning, geometry and dimensional characteristics of each one of the portions of the different materials. For ease of description, in the course of the description, only reference to inspection of an article will be made, but it will be understood that, in an embodiment, inspection of only a region of interest of the article can be performed. It will also be understood that the method can be applied successively to multiple articles, thereby providing scanning of a plurality of successive articles, such as in a production chain or the like.

In the embodiment shown, for each one of the successively manufactured article, the method 10 includes the general steps of: performing surface profile acquisition 11; acquiring successive radiographic images of the article 14; determining a precise position of the article (registration step) for each one of the acquired radiographic images 12; generating simulated radiographic images of the article 13 based on the determined positions of the article and the detailed 3D model; comparing the simulated radiographic images and the acquired radiographic images 15; iteratively adjusting (correcting) the detailed 3D model until the simulated radiographic images of the article and the acquired radiographic images match 16. The method also includes performing a metrology assessment 17 and/or a subsurface defect detection 18 based on the adjusted detailed 3D model (i.e. the actual 3D model representative of the article inspected) and performing data visualization 24 based on the data of the metrology assessment and/or the subsurface defect detection previously performed.

In an embodiment, the step of performing surface profile acquisition 11 includes performing a profile surface scan of the article. For example and without being limitative, in an embodiment, the profile surface scan can be performed by one or more two-dimensional (2D) laser scanner triangulation devices performing a profile surface scan of the article, as it is being conveyed on a motion device. The surface profile acquisition yields a precise 3D surface profile 21 of the article (the third dimension being provided by the displacement of the article on the motion device). In an alternative embodiment, the profile surface scan can be performed by one or more two-dimensional (2D) laser scanner triangulation devices performing a profile surface scan of the article as the laser are displaced relative to the article, as will be described in more details below.

In the embodiment shown where surface profile acquisition 11 is performed, the method can further comprise adjusting the theoretical detailed 3D model (base 3D Mesh) 22 based on the acquired surface profile 21 of the article and generating an updated 3D model (New 3D Mesh) 23.

One skilled in the art will understand that, in alternative embodiments, other devices for performing profile surface scan, such as video cameras, infrared cameras, millimeter wave sensors, or the like can also be used.

One skilled in the art will also understand that, in an alternative embodiment (not shown), the method can also be free of the step of surface profile acquisition 11. In such an embodiment, the theoretical detailed 3D model (base 3D Mesh) is directly used for performing the initial generation of simulated radiographic images of the article 13 based on the determined positions of the article and the detailed 3D model, which will be described in more details below.

The step of acquiring successive radiographic images of the article 14 includes scanning the article using a radiographic image acquisition device including one or more radiographic source(s), such as, X-ray source(s) or gamma-ray source(s), and corresponding detector(s), positioned on opposed sides of the article. Once again, in an embodiment, the article is scanned using the radiographic source(s) and corresponding detector(s), as it is being conveyed on the motion device at a constant speed, therefore resulting in a continuous sequence of radiographic images of the article 14 being captured at a known interval, as the article is conveyed linearly with regard to the radiographic image acquisition device. For example, the motion device can be a linear stage, a conveyor belt or other similar device. It will be understood that, the smaller the interval between the images of the continuous sequence of radiographic images, the higher the number of views available and the more precise the resulting 3D dimensioning positioning (which will be described in more details below) can be.

In an alternative embodiment, the acquisition of the radiographic images can be performed as the radiographic source(s) and corresponding detector(s) are displaced relative to the article, as will be described in more details below.

In an embodiment where a simple object is scanned, the step of acquiring successive radiographic images of the article 14 can include acquiring at least about 25 images defining a continuous sequence of images, with each image providing a unique viewing angle of the article. Typically, the step of acquiring successive radiographic images of the article 14 will includes acquiring several hundred images (and at least about one hundred images) defining a continuous sequence of images, with each image providing a unique viewing angle of the article.

The step of determining a precise position of the article 12 for each one of the acquired radiographic images includes determining a precise position and orientation of the article relative to the radiographic source(s) and corresponding detector(s) for each one of the acquired radiographic images. In other words, the article must be registered in 3D space, in order to generate the simulated radiographic images from the detailed 3D model (as will be described in more details below). In an embodiment where the article is linearly moved by the motion device, the registration must be synchronized with the linear motion device so that a sequence of simulated images that matches the actual sequence of radiographic images can be generated.

In an embodiment, the precise relative position (X, Y and Z) and orientation of the article with regards to the radiographic source(s) and corresponding detector(s) is performed through analysis of the corresponding acquired radiographic image, using intensity-based or feature-based image registration techniques, with or without fiducial points. In an embodiment, for greater precision, the acquired surface profile 21 of the article can also be analysed and used, alone or in combination to the corresponding acquired radiographic image, in order to determine the precise position of the article. In such an embodiment, the positioning of the radiographic image acquisition device relative to the device used for acquiring the surface profile 21 is known and used to determine the position of the article relative to the radiographic source(s) and corresponding detector(s).

The step of generating simulated radiographic images of the article 13 based on the determined positions of the article and the detailed 3D model is performed by a radiographic image simulator simulating the sequence of acquired radiographic images, using the detailed 3D model, the known material properties of the article, and the known configuration of the radiographic source and sensor array to reproduce faithfully the geometry and physics of the radiographic scan being performed.

In an embodiment, the radiographic image simulator simulates the path of the radiation through the article, using ray casting, for each simulated sensor array, in view of the position, geometry and configuration of the calibrated radiographic source(s) and corresponding detector(s) relative to the article; the geometry of the article as defined by the detailed 3D model and the material(s) thereof. In other words, in an embodiment, the radiographic image simulator uses ray casting through the mesh to define the optical paths for every pixel in the sensor array and converts this data into intensity values that corresponds to the physics of the material(s) in the object, while taking into consideration the source and detector calibration. In an embodiment, the radiographic image simulator therefore simulates the path of the radiation through every surface of the article, crossing the radiation path, i.e. every frontier which is crossed by the radiation path, and which potentially impacts the trajectory of the radiation going through the article.

In an embodiment where the article includes a plurality of material, a detailed 3D model can be generated for each region of interest of the article represented by the corresponding material and simulated radiographic images can be generated for each detailed 3D model corresponding to one region of interest of the article made of the corresponding material, in accordance with the above-described principles. Therefore, the radiographic image simulator can simulate multiple layers of materials as well as multiple types of materials. In other words, in an embodiment where the article includes a plurality of materials, the radiographic image simulator must take into consideration each layer individually.

A simulated radiographic image is generated for each one of the predetermined position of the article for which a radiographic image of the article is acquired in the previous step of acquiring successive radiographic images of the article 14. In other words, a simulated radiographic image is generated for each radiographic image acquired and corresponding to a registration of the article in a 3D space. It will be understood that, in this step, either one of the theoretical detailed 3D model (base 3D Mesh) 22 or the updated 3D model (New 3D Mesh) 23 can be used (as will be described in more details below).

The step of comparing the simulated radiographic images and the acquired radiographic images 15 is performed using comparison methods to determine whether the simulated radiographic images of the article and the acquired radiographic images match or if there are differences between the two sets of images, indicating that the article does not conform to the detailed 3D model used for generating the simulated radiographic images. The differences can be differences in positioning, geometry, presence of defects or even differences in density.

In an embodiment, the images can be converted to binary images and comparison can be performed through binary images subtraction. In an alternative embodiment, the images can be compared using gray level distribution (or intensity profile) alone or in combination with binary images subtraction. One skilled in the art will understand that any other image comparison methods and/or combinations thereof, adapted to the geometry of the manufactured article, can also be used.

In an embodiment, given that a sequence of radiographic images is acquired, feature tracking from one image to another can be used to locate each of the differences in 3D space. In other words, in an embodiment, multiple features are identified in the simulated radiographic images and the acquired radiographic images and their position is tracked through the entire scan sequence (and corresponding simulated scan sequence). The plurality of angular position for the features (obtained from the plurality of images in the continuous sequence of images) helps precisely position the features in 3D space to subsequently produce an updated 3d Model that better corresponds to the actual article being inspected. In the course of the present description, the term feature is used to refer to specific structures in the image such as points, edges or objects that can easily be detected and used for analysis and comparison.

The method 10 further comprises the step of performing a 3D model correction loop for iteratively adjusting the detailed 3D model until the simulated radiographic image of the article and the acquired radiographic image match. In other words, the detailed 3D model is iteratively morphed until the detail 3D model matches the article being scanned. As mentioned above, in an embodiment, the theoretical detailed 3D model (base 3D Mesh) 22 can be initially adjusted based on the acquired surface profile 21 of the article to generate an updated 3D model (New 3D Mesh) 23 which defines the latest version of the detailed 3D model for the first iteration. In an alternative embodiment (not shown), the theoretical detailed 3D model (base 3D Mesh) 22 can be used as the latest version of the detailed 3D model for the first iteration.

In the embodiment shown, the latest version of the detailed 3D model is subsequently iteratively adjusted (corrected), using a morphing algorithm to adapt the detailed 3D model in accordance with the observed differences, until a match is found between the simulated radiographic images and the acquired radiographic images (as determined in step 15). Hence, for each iteration, if the determination of whether the simulated radiographic images of the article and the acquired radiographic images match is negative (i.e. if a match result indicative of whether the simulated radiographic images and the acquired radiographic images are a match or a mismatch indicates a mismatch—therefore indicating that differences are found between the two sets of images), the latest version of the detailed 3D model is updated (corrected) to attempt to eliminate the differences between the simulated radiographic images of the article and the acquired radiographic images and a newly updated 3D model (New 3D Mesh) 23 is generated.

The newly updated 3D model (New 3D Mesh) 23 is subsequently used for generating the sequence of simulated radiographic images of the article (as described in detail above with regards to step 13) and the new simulated radiographic images are compared to the acquired radiographic images (as described in detail with regards to step 15). If the simulated radiographic images of the article generated using the newly updated 3D model (New 3D Mesh) 23 once again do not match the acquired radiographic images, a new iteration can be performed using the newly updated 3D model (New 3D Mesh) 23 as latest version of the detailed 3D model. When the simulated radiographic images of the article and the acquired radiographic images match, the last newly updated 3D model (New 3D Mesh) 23 is used as final 3D model (Actual 3D Mesh) 25 representative of the article currently being inspected (i.e. the final 3D model (Actual 3D Mesh) 25 corresponds to the actual geometric dimensions of the article being inspected). In an embodiment where metrology is performed, a determination of the simulated radiographic images of the article and the acquired radiographic images being a match can correspond to a tolerance of below about 10 microns (for articles of about 30 cm or less). In an embodiment where subsurface defect detection is performed, a determination of the simulated radiographic images of the article and the acquired radiographic images being a match can correspond to a tolerance of between about 50 microns and about 100 microns (for articles of about 30 cm or less).

In an embodiment, updating (morphing) the latest version of the detailed 3D model to attempt to eliminate the differences between the simulated radiographic images of the article and the acquired radiographic images includes performing imagery analysis of the sequence of simulated radiographic images of the article and the acquired sequence of radiographic images in order to determine a most probable cause of the differences between the simulated radiographic images of the article and the acquired radiographic images. For example and without being limitative, in an embodiment, the required imagery analysis includes identification and characterization of the deviation between the simulated radiographic images of the article and the acquired radiographic images, for example, using image subtraction and/or intensity profile comparison and displacing control points of the latest version of the detailed 3D model to correct the identified deviation(s).

In an embodiment, morphing the latest version of the detailed 3D model to attempt to eliminate the differences between the simulated radiographic images of the article and the acquired sequence of radiographic images includes feature identification being performed using a registration algorithm and every feature detected being uniquely characterized to determine whether it is an expected feature resulting from the object geometry or an anomaly resulting from a defect (either a geometry defect or a subsurface defect). A similar feature identification process is performed for the simulated radiographic images and the acquired radiographic images and each pair of feature (i.e. a corresponding feature of the simulated radiographic images and the acquired radiographic images) is scored for similarity (i.e. is rated according to the level of similarity between the simulated radiographic images and the acquired radiographic images). Subsequently, an image modification algorithm is performed to suggest deformation for each one of the simulated radiographic images, in order to bring each simulated radiographic image as close as possible to a match with its corresponding acquired radiographic image. In an embodiment, a deformation is suggested for each pixel of the simulated radiographic images and a score is provided based on the quality of the match between the simulated radiographic image and the corresponding acquired radiographic image for the proposed deformation (i.e. the proposed deformation of each pixel of the simulated radiographic images). If required, the steps related to the deformation of the simulated radiographic images are repeated until a predetermined scoring threshold is attained. In the above described process, each pair of corresponding simulated radiographic image and acquired radiographic image is treated (i.e. processed) independently.

Once the required deformation is optimized for each pair of corresponding simulated radiographic image and acquired radiographic image, the deformations must be transferred to the latest version of the detailed 3D model. In order to transfer the deformations of a plurality of simulated radiographic images of the image sequence, in an embodiment a parallax effect across all images in the sequence is used, thereby resulting in identification of only one combined 3D deformation (i.e. only one combined deformation applied globally to the 3D model) correlated to all of the individual 2D deformations in each pair of corresponding simulated radiographic image and acquired radiographic image.

In an embodiment where the 3D position of the deformation does not correspond to the surface of the latest version of the detailed 3D model, which is typically the case for an internal defect, such as, for example, an air bubble in a die casting part, a seed mesh region is created and the above described optimization steps are performed again for the particular region of interest to ensure a proper match between the newly created seed mesh and the information of the acquired radiographic images.

In an embodiment where the 3D position of the deformation corresponds to the surface of the latest version of the detailed 3D model, a sparse triangular mesh can be used to apply the deformation. Using the sparse triangular mesh, the transformation can be applied to only a fraction of vertices in the area, saving processing time. The deformation field is applied to the center of each triangle and as a result, the uninvolved vertices in the area are moved linearly, but non-rigidly.

It will be understood that in a continuous sequence of images, the X and Y displacement of a feature pixel can be tracked and predicted across the continuous sequence of images and can yield a Position vs Step plot with a given slope and intercept. It thus becomes possible, with the slope of the X vs Time Step graph to extract depth (Z) information.

In view of the above, the newly updated 3D model (New 3D Mesh) can be morphed to iteratively adjust a geometry or a material density of a region of interest of the 3D model to eliminate the differences between the simulated radiographic images of the article and the acquired radiographic images, in order to finally generate a final 3D model (Actual 3D Mesh) 25 accurately representative of the article scanned, with regard to geometry, subsurface defects and density of the material(s).

In some cases, such as when a presence of voids or contaminants within the object is detected, new layers of mesh can be added to the newly updated 3D model (New 3D Mesh) 23 in order to match the observed data.

In the embodiment shown, the step of performing the metrology assessment 20 includes comparing the theoretical detailed 3D model (Base 3D Mesh) 22 and the final 3D model (Actual 3D Mesh) 25 in order to determine whether differences are detected in the geometry of the inspected article defined by the final 3D model (Actual 3D Mesh) 25 and the model article defined by the theoretical detailed 3D model (Base 3D Mesh) 22 and generating metrology assessment data. One skilled in the art will understand that, in an alternative embodiment (not shown) the method can be free of metrology assessment (i.e. the method could include only the subsurface defect detection step, as described below).

In an embodiment, comparison of the theoretical detailed 3D model (Base 3D Mesh) 22 and the final 3D model (Actual 3D Mesh) 25 is achieved by acquiring geometric measurements on the theoretical detailed 3D model (Base 3D Mesh) 22 and the final 3D model (Actual 3D Mesh) 25 based on control points and predetermined tolerances of the model, for the specific article that is manufactured, and comparing the acquired geometric measurements of both models to determine if there are variations beyond the associated tolerances thereof. In an alternative embodiment, comparison between the theoretical detailed 3D model (Base 3D Mesh) 22 and the final 3D model (Actual 3D Mesh) can also be performed via a deviations display using color coding.

In the embodiment shown, the step of performing subsurface defect detection 18 includes comparing the theoretical detailed 3D model (Base 3D Mesh) 22 and the final 3D model (Actual 3D Mesh) 25 in order to determine whether differences are detected in the internal structure of the inspected article defined by the final 3D model (Actual 3D Mesh) 25 and the model article defined by the theoretical detailed 3D model (Base 3D Mesh) 22, outside of dimensional measurements, and generating subsurface defect detection data. One skilled in the art will once again understand that, in an alternative embodiment (not shown) the method can be free of subsurface defect detection (i.e. the method could include only a metrology assessment step, as described above).

Finally, in an embodiment, the step of performing data visualization 24 based on the data of the metrology assessment and/or the subsurface defect detection previously performed includes displaying the metrology assessment data and/or the subsurface defect detection data (or inspection data) on a display screen. Moreover, in an embodiment, data relating to the metrology assessment and/or the subsurface defect detection can be stored on a storage medium in order to remain subsequently available to the end users. For example, and without being limitative, the storage medium can be a permanent storage such as a hard disk; an optical storage device, such as a CD or DVD (rewritable or write once/read only), a flash memory, or the like. In an embodiment, the data of the metrology assessment and/or the subsurface defect detection can be used to automatically evaluate whether each one of the inspected article conforms to selected criteria and sort the articles based on this evaluation. The data can also be used to evaluate the performance of the manufacturing equipment or the like.

In an alternative embodiment, the data of the metrology assessment and/or the subsurface defect detection can be used to perform article sorting. In such an embodiment, the metrology assessment data and/or the subsurface defect detection data can be used to determine a status of the article (e.g. a pass or fail status based on pre-defined criteria) and the status can be used to direct the article in the production line (for example to reject article(s) having the fail status). One skilled in the art will understand that, in such and embodiment, display of the data can be omitted.

The method for performing the inspection of a manufactured article having been described above, a system which allows the method to be performed will now be described in more details below.

Figure 2:
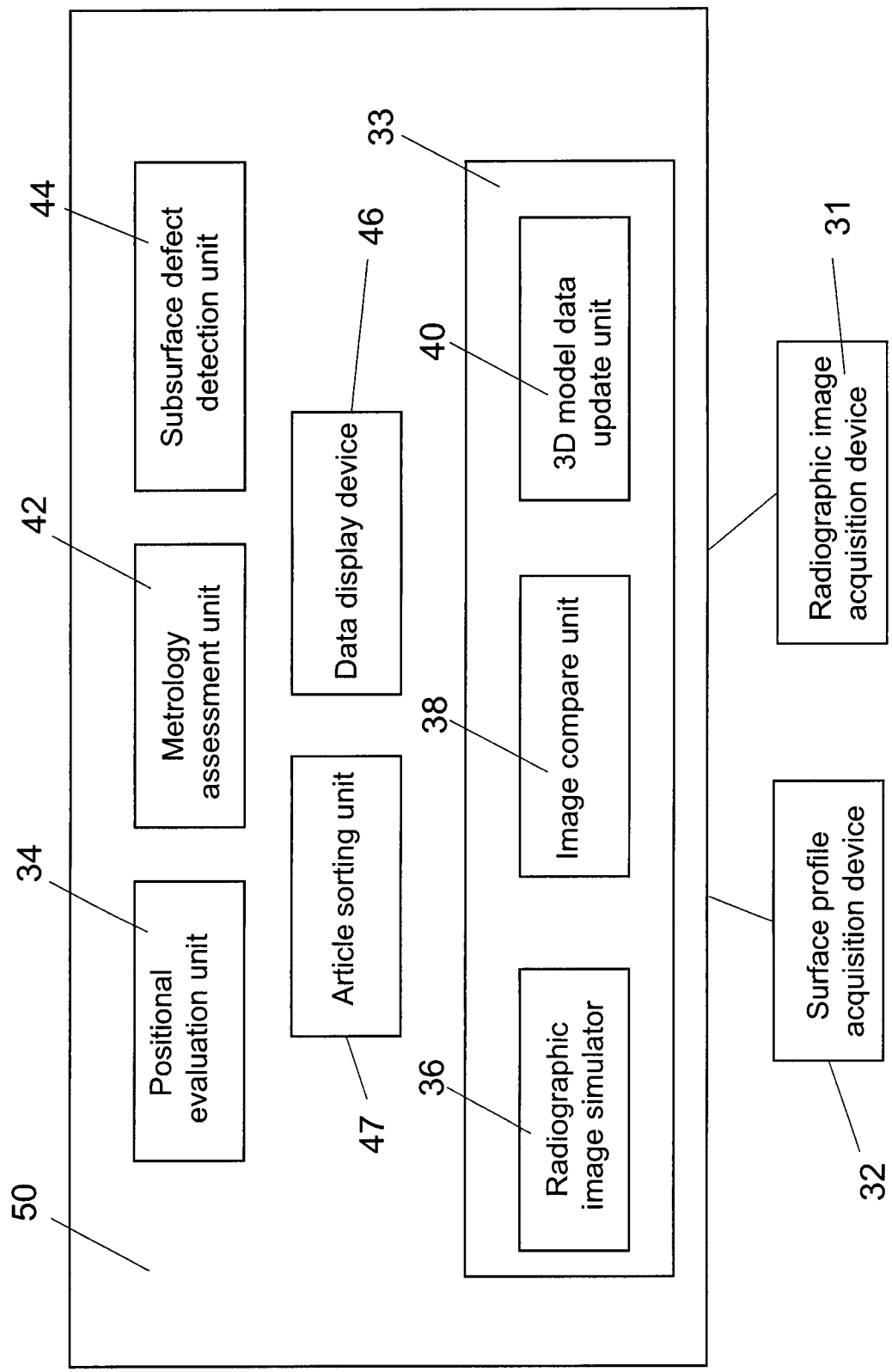
FIG. 2 is a schematic representation of a system for performing inspection of a manufactured article, in accordance with an embodiment.
Figure 3:
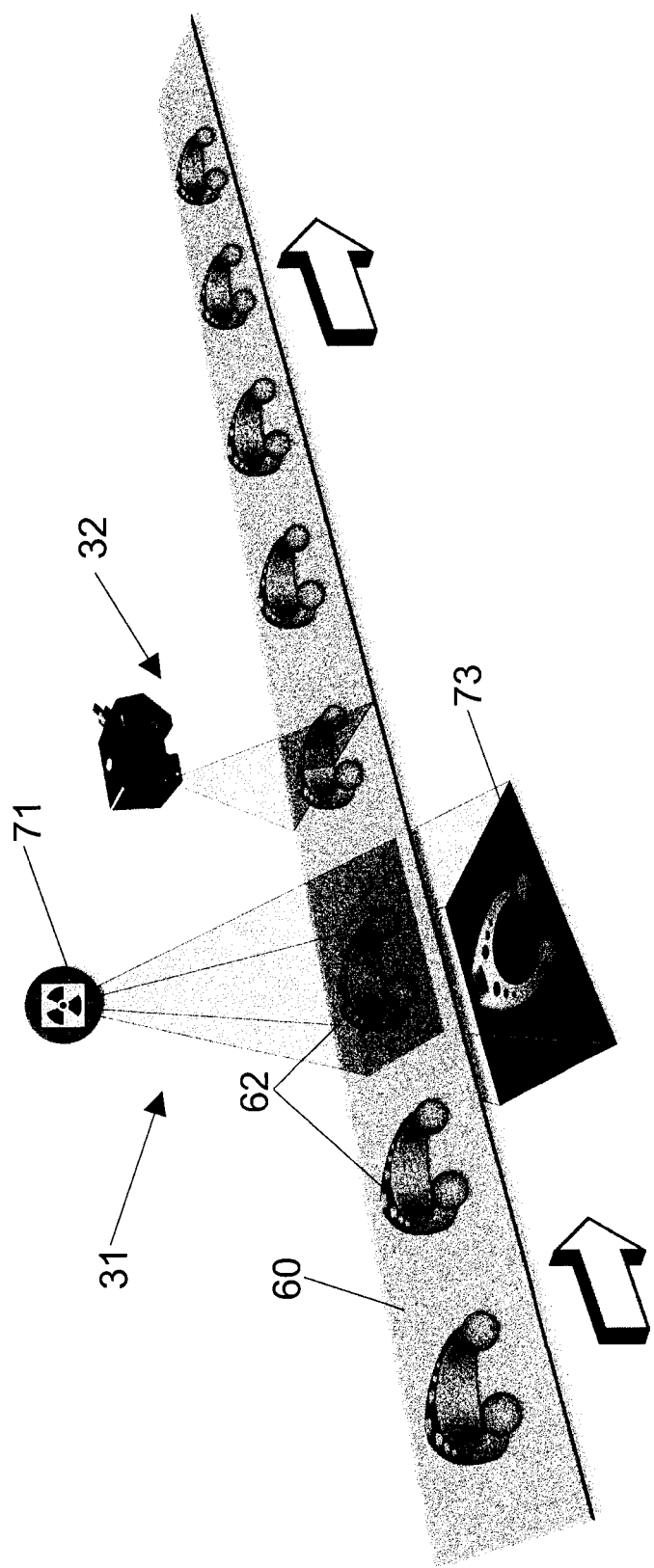
FIG. 3 is a schematic representation of an embodiment of a surface profile acquisition device and a radiographic image acquisition device of the system of FIG. 2, in combination with an article being conveyed on a motion device.
Figure 4:
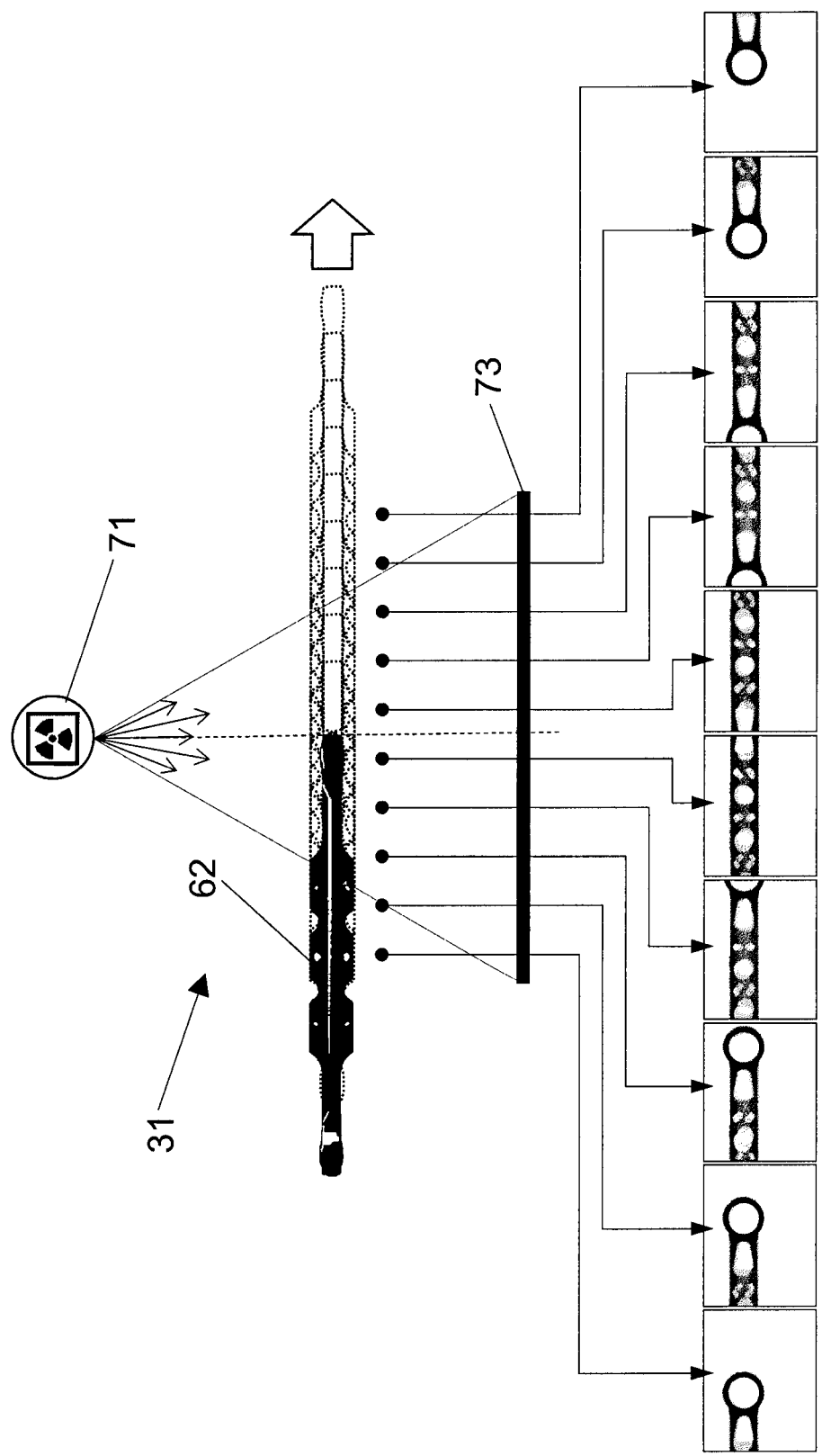
FIG. 4 is a schematic representation of the radiographic image acquisition device of FIG. 3, acquiring a sequence of radiographic images of the article.

With reference to FIGS. 2 to 4, in an embodiment, the system 30 includes a surface profile acquisition device 32, a radiographic image acquisition device 31, a positional evaluation unit 34, a 3D model data correction unit 33 (including a radiographic image simulator 36, an image compare unit 38, and a 3D model data update unit 40), a metrology assessment unit 42, a subsurface defect detection unit 44, a data display device 46, and an article sorting unit 47.

The system 30 also includes a motion device 60 creating relative movement between the manufactured article 62 and the combination of the surface profile acquisition device 32 and the radiographic image acquisition device 31. In the course of the present description, the term "relative movement" is used to refer to at least one of the elements moving linearly with respect to the other. In other words, the motion device 60 displaces at least one of the manufactured article 62 and the combination of the surface profile acquisition device 32 and the radiographic image acquisition device 31 linearly, in order to generate relative movement therebetween. In the embodiment shown in FIG. 3, where the motion device 60 displaces the manufactured article 62, the motion device 60 can be a linear stage, a conveyor belt or other similar devices, displacing linearly the manufactured article 62 relative to the surface profile acquisition device 32 and the radiographic image acquisition device 31 remaining still. In another alternative embodiment, the manufactured article 62 can remain still and the surface profile acquisition device 32 and the radiographic image acquisition device 31 can be displaced, for example and without being limitative, by an articulated arm, a displaceable platform, or the like. In an embodiment, both the manufactured article 62 and the surface profile acquisition device 32 and the radiographic image acquisition device 31 can be displaced during the inspection process.

As mentioned above, in an embodiment, the surface profile acquisition device 32 can include any device capable of performing a precise profile surface scan of the article 62 as relative movement occurs between the article 62 and the surface profile acquisition device 32 and generate surface profile data therefrom. In an embodiment, the surface profile acquisition device 32 performs a profile surface scan with a precision in a range of between about 1 micron and 50 microns. For example and without being limitative, in an embodiment, the surface profile acquisition device 32 can include one or more two-dimensional (2D) laser scanner triangulation devices positioned and configured to perform a profile surface scan of the article 62 as it is being conveyed on the motion device 60 and to generate the surface profile data for the article 62. As mentioned above, in an embodiment, the system 30 can be free of surface profile acquisition device 32.

The radiographic image acquisition device 31 has also been described above in the description of the associated method. As previously mentioned, the radiographic image acquisition device 31 includes one or more radiographic source(s) 71 and corresponding detector(s) 73 positioned on opposite sides of the article 62 as relative movement occurs between the article 62 and the radiographic image acquisition device 31, in order to capture a continuous sequence of a plurality of radiographic images at a known interval of the article 62 (see FIG. 4). In an embodiment (see FIGS. 3 and 4), the radiographic source(s) 71 is a cone beam X-ray source(s) generating X-rays towards the article 62 and the detector(s) 73 is a 2D X-rays detector(s). In an alternative embodiment, the radiographic source(s) can be gamma-ray source(s) generating gamma-rays towards the article 62 and the detector(s) can be 2D gamma-rays detector(s). In an embodiment, 1D detectors positioned such as to cover different viewing angles can also be used. One skilled in the art will understand that, in alternative embodiments, any other image acquisition device allowing subsurface scanning and imaging of the article 62 can also be used.

One skilled in the art will understand that the configuration of the radiographic image acquisition device 31 can vary according to the type of article 62 to be inspected. For example and without being limitative, the number, position and orientation of the radiographic source(s) 71 and corresponding detector(s) 73, as well as the angular coverage, object spacing, acquisition rate and/or resolution can be varied according to the specific inspection requirements of each embodiment.

In an embodiment, the positional evaluation unit 34 is in data communication with the radiographic image acquisition device 31 and the surface profile acquisition device 32 and receives the surface profile data and the acquired radiographic images therefrom. In an embodiment where the system is free of surface profile acquisition device 32, the positional evaluation unit 34 can be in data communication with only the radiographic image acquisition device 31. The positional evaluation unit 34 is configured to process the surface profile data and/or the acquired radiographic images (i.e. to perform image processing of the received radiographic images and/or the surface scan defined by the surface scan data) and to generate article position data representative of the precise position of the article 62 relative to the radiographic image acquisition device 31, for each one of the acquired radiographic images.

In an embodiment where the motion of the article 62 provided by the motion device 60 is predetermined (or controlled according to known parameters), the surface profile acquisition device 32 can be positioned at any predetermined fixed position with regard to the image acquisition device 31. The positioning and orientation of the article 62 for each image of the sequence of radiographic image acquired by the image acquisition device 31 can be computed therefrom (given that no motion of the article 62 other than motion by the motion device 60 occurs). However, in order to reduce the probabilities of inaccuracies of the data acquired by the surface profile acquisition device 32 for registration of the article 62 when the sequence of radiographic image is acquired by the image acquisition device 31, in an embodiment (not shown), the surface profile acquisition device 32 is positioned as close as possible to the center of the radiation emitted by the image acquisition device 31.

In an embodiment, the system 30 also includes a 3D model data correction unit 33 in data communication with the radiographic image acquisition device 31 and the positional evaluation unit 34 and receiving the acquired radiographic images and article position data therefrom. The 3D model data correction unit 33 is operative to iteratively update the 3D model data and generate final 3D model data defining a 3D model substantially conform to the geometric dimensions of the manufactured article 62.

In an embodiment, the 3D model data correction unit 33 includes a radiographic image simulator 36 configured to simulate the path of the radiation rays from the radiographic image acquisition device 31 into the manufactured article 62 (as defined by the detailed 3D model defined by the 3D model data), using the position data representative of the position of the manufactured article 62 relative to the radiographic image acquisition device 31, for each radiographic image of the sequence of radiographic images acquired by the radiographic image acquisition device 31. The radiographic image simulator 36 generates the simulated radiographic images through the above-described simulation of the path of the radiation rays into the manufactured article 62.

The 3D model data correction unit 33 also includes an image compare unit 38 configured to compare the generated simulated radiographic images and the acquired radiographic images and to generate a match result indicative of whether the simulated radiographic images and the acquired radiographic images are a match or a mismatch.

The 3D model data correction unit 33 further includes a 3D model data update unit 40. The 3D model data update unit 40 is configured to update the detailed 3D model data upon detection of the match result of the simulated radiographic images and the acquired radiographic images being a mismatch. In order to proceed with such update of the detailed 3D model data, the 3D model data update unit 40 is configured to perform imagery analysis of the simulated radiographic images and the acquired radiographic images and to determine a most probable cause of the mismatch, as described above. Based on the determined most probable cause of the mismatch, the 3D model data update unit 40 is configured to generate updated detailed 3D model data of the article 62.

As will be easily understood by one skilled in the art, the components of the 3D model data correction unit 33 cooperate to iteratively update the 3D model data until a final 3D model defining a 3D model conforming to the geometric dimensions of the manufactured article 62 is generated and included in the 3D model data.

In an embodiment, the system 30 also includes a metrology assessment unit 42 in data communication with the 3D model correction unit 33 and receiving the detailed 3D model data therefrom. In an embodiment, the metrology assessment unit 42 is configured to process the 3D model data and perform a metrology assessment through comparisons of a theoretical 3D model of the detailed 3D model data and the final 3D model of the detailed 3D model data to detect differences therebetween and generate article inspection data. In an embodiment, the system 30 can be free of metrology assessment unit 42.

In an embodiment, the system 30 also includes a subsurface defect detection unit 44 in data communication with the 3D model correction unit 33 and the radiographic image acquisition device 31 and receiving the acquired radiographic images and simulated radiographic images therefrom. In an embodiment, the subsurface defect detection unit 44 is configured to process the 3D model data and perform a subsurface detection assessment through comparisons of a theoretical 3D model of the detailed 3D model data and the final 3D model of the detailed 3D model data to detect differences therebetween and generate article inspection data. In an embodiment, the system can be free of subsurface defect detection unit 44.

In an embodiment, the article inspection data can be displayed on a data display device 46, such as, for example, and without being limitative, a display screen or the like. In an embodiment, the article inspection data can also be stored on a storage medium for subsequent retrieval and/or display. In an embodiment, the system can be free of data display device 46.

In an embodiment, the system can also include an article sorting unit 47 in data communication with the metrology assessment unit 42 and/or the subsurface defect detection unit. In an embodiment, the article sorting unit 47 is configured to process the article inspection data and perform sorting of the article 62 based on the processed article inspection data. For example and without being limitative, in an embodiment, the article sorting unit 47 can determine a pass or fail status of the article, based on pre-defined criteria, such as deviation from the theoretical geometry a defect threshold or the like. The article sorting unit 47 can include an ejector activable to remove the article 62 from the production line if the article 62 has a fail status. In an embodiment, the system can be free of article sorting unit 47.

One skilled in the art will understand that the positional evaluation unit 34, the 3D model data correction unit 33 (including the radiographic image simulator 36, the image compare unit 38, and the 3D model data update unit 40), the metrology assessment unit 42, and the subsurface defect detection unit 44 can be embodied on a single computing unit 50 having its own memory and processor. In an alternative embodiment (not shown), the components can be part of a distributed computing system where each unit (or a subset thereof) is installed on a separate computing unit having its own memory and processor.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A method for performing inspection of a manufactured article defined by a detailed three-dimensional model, the method comprising:
  acquiring a sequence of radiographic images of the article using a radiographic image acquisition device including at least one sensor array, the acquisition of the sequence of radiographic images being performed as relative movement occurs between the article and the radiographic image acquisition device;
  performing registration of the article in 3D space relative to the radiographic image acquisition device for each one of the acquired radiographic images; and
  performing a three-dimensional model correction loop comprising, iteratively:
    generating a simulated radiographic image for each radiographic image acquired and corresponding to a registration of the article in a 3D space, generation of the simulated radiographic images being performed by ray casting through the detailed three-dimensional model to define the optical path of each pixel of the at least one sensor array;
    comparing the simulated radiographic images and the acquired radiographic images and generating a match result indicative of whether the simulated radiographic images and the acquired radiographic images are a match or a mismatch;
    if the match result is indicative of a mismatch,
      performing imagery analysis of the simulated radiographic images and the acquired radiographic images to identify and characterize differences between the simulated radiographic images and the acquired radiographic images; and
      correcting one of a geometry and a material density of a region of interest of the detailed three-dimensional model of the article based on each one of the identified and characterized differences; and
      performing a new iteration of the three-dimensional model correction loop until a final detailed three-dimensional model is obtained.

2. The method of claim 1, further comprising performing at least one of a metrology assessment and a subsurface defect detection performed using the detailed three-dimensional model, the metrology assessment generating metrology assessment data and the subsurface defect detection generating subsurface defect detection data.

3. The method of claim 2, further comprising performing at least one of data visualization and article sorting based on at least one of the metrology assessment data and the subsurface defect detection data.

4. The method of claim 2, wherein the manufactured article is originally defined by a theoretical detailed three-dimensional model and the step of performing the three-dimensional model correction loop comprises, if the match result is indicative of a match, generating the final detailed three-dimensional model corresponding to an actual detailed three-dimensional model and conform to the geometric dimensions of the manufactured article, and wherein the step of performing the metrology assessment comprises comparing the theoretical detailed three-dimensional model and the final detailed three-dimensional model.

5. The method of claim 1, further comprising acquiring surface profile data for the article using a surface profile acquisition device, the acquisition of the surface profile data being performed as relative movement occurs between the article and the surface profile acquisition device.

6. The method of claim 5, wherein the step of performing registration of the article in 3D space for each one of the acquired radiographic images of the article comprises analysing the acquired surface profile data and positioning the article using the analysed surface profile data.

7. The method of claim 5, further comprising correcting the detailed three-dimensional model using the acquired surface profile data.

8. The method of claim 1, wherein the step of acquiring radiographic images of the article using a radiographic image acquisition device includes acquiring at least about 25 radiographic images defining a continuous sequence of images, with each image providing a unique viewing angle of the article.

9. The method of claim 8, wherein the step of acquiring radiographic images of the article using a radiographic image acquisition device includes acquiring at least about 100 radiographic images defining a continuous sequence of images, with each image providing a unique viewing angle of the article.

10. The method of claim 1, wherein the step of performing imagery analysis of the simulated radiographic images and the acquired radiographic images to identify and characterize differences between the simulated radiographic images and the acquired radiographic images comprises using feature tracking from one image to another to locate each of the differences in 3D space.

11. A method for performing inspection of a manufactured article defined by a detailed three-dimensional model, the method comprising:
acquiring a sequence of radiographic images of the article using a radiographic image acquisition device comprising at least one sensor array, the acquisition of the sequence of radiographic images being performed as relative movement occurs between the article and the radiographic image acquisition device;
performing registration of the article in 3D space relative to the radiographic image acquisition device for each one of the acquired radiographic images;
generating a simulated radiographic image for each radiographic image acquired and corresponding to a registration of the article in a 3D space, generation of the simulated radiographic images being performed by ray casting through the detailed three-dimensional model to define the optical path of each pixel of the at least one sensor array;
comparing the simulated radiographic images and the acquired radiographic images and generating a match result indicative of whether the simulated radiographic images and the acquired radiographic images are a match or a mismatch and
performing a three-dimensional model correction loop comprising, until the match result is indicative of a match, iteratively:
performing imagery analysis of the simulated radiographic images and the acquired radiographic images to identify and characterize differences between the simulated radiographic images and the acquired radiographic images; and
correcting one of a geometry and a material density of a region of interest of the detailed three-dimensional model of the article based on each one of the identified and characterized differences and generating a corrected detailed three-dimensional model;
generating a new simulated radiographic image for each radiographic image acquired and corresponding to a registration of the article in a 3D space determined position of the article relative to the radiographic image acquisition device corresponding to one of the acquired radiographic images, generation of the simulated radiographic images being performed by ray casting through the corrected detailed three-dimensional model of the article to define the optical path of each pixel of the at least one sensor array; and
comparing the new simulated radiographic images and the acquired radiographic images and generating the match result indicative of whether the new simulated radiographic images and the acquired radiographic images are a match or a mismatch;
performing at least one of a metrology assessment and a subsurface defect detection based on the image comparison data, the metrology assessment generating metrology assessment data and the subsurface defect detection generating subsurface defect detection data.

12. The method of claim 11, wherein the manufactured article is originally defined by a theoretical detailed three-dimensional model and the step of performing the three-dimensional model correction loop comprises, once the match result is indicative of a match, generating a final detailed three-dimensional model corresponding to a last corrected detailed three-dimensional model and conform to the geometric dimensions of the manufactured article and wherein performing the metrology assessment comprises comparing the theoretical detailed three-dimensional model and the final detailed three-dimensional model.

13. The method of claim 11, further comprising the step of acquiring surface profile data for the article using a surface profile acquisition device, the acquisition of the surface profile data being performed as relative movement occurs between the article and the surface profile acquisition device.

14. The method of claim 13, wherein the step of determining a position of the article for each one of the acquired radiographic images of the article comprises analysing the acquired surface profile data and positioning the article based on the analysed surface profile data.

15. The method of claim 13, further comprising correcting the detailed three-dimensional model using the acquired surface profile data.

16. The method of claim 11, further comprising performing at least one of data visualization and article sorting based on at least one of the metrology assessment data and the subsurface defect detection data.

17. The method of claim 11, wherein the step of acquiring radiographic images of the article using a radiographic image acquisition device includes acquiring at least about 25 radiographic images defining a continuous sequence of images, with each image providing a unique viewing angle of the article.

18. The method of claim 17, wherein the step of acquiring radiographic images of the article using a radiographic image acquisition device includes acquiring at least about 100 radiographic images defining a continuous sequence of images, with each image providing a unique viewing angle of the article.

19. The method of claim 18, wherein the step of performing imagery analysis of the simulated radiographic images and the acquired radiographic images to identify and characterize differences between the simulated radiographic images and the acquired radiographic images comprises using feature tracking from one image to another to locate each of the differences in 3D space.

20. A system for performing inspection of a manufactured article defined by detailed three-dimensional model data, the system comprising:
   a radiographic image acquisition device acquiring a sequence of radiographic images of the article as relative movement occurs between the radiographic image acquisition device and the manufactured article, the radiographic image acquisition device comprising at least one sensor array;
   a motion device operatively connected to one of the manufactured article and the radiographic image acquisition device and generating the relative movement between the manufactured article and the radiographic image acquisition device;
   a positional evaluation unit in data communication with the radiographic image acquisition device and receiving the acquired radiographic images therefrom, the positional evaluation unit being configured to perform image processing of the received radiographic images and generating article position data representative of the position of the article relative to the radiographic image acquisition device for each one of the acquired radiographic images;
   a three-dimensional model correction unit in data communication with the radiographic image acquisition device and the positional evaluation unit and receiving the acquired radiographic images and article position data therefrom, the three-dimensional model correction unit comprising:
      a radiographic image simulator configured to simulate a path of the radiation rays of the radiographic image acquisition device through the manufactured article using ray casting through the detailed three-dimensional model represented by the detailed three-dimensional model data to define the optical path of each pixel of the at least one sensor array, based on the position data representative of the position of the article relative to the radiographic image acquisition device for each radiographic image acquired by the radiographic image acquisition device, and to generate simulated radiographic images therefrom;
      an image compare unit configured to compare the simulated radiographic images and the acquired radiographic images and to generate a match result indicative of whether the simulated radiographic images and the acquired radiographic images are a match or a mismatch;
      a three-dimensional model update unit configured to, upon detection of the match result being a mismatch, perform imagery analysis of the simulated radiographic images and the acquired radiographic images to identify and characterize differences between the simulated radiographic images and the acquired radiographic images and correct one of a geometry and a material density of the detailed three-dimensional model data, the three-dimensional model update unit generating updated detailed three-dimensional model data representative of a corrected three-dimensional model of the article matching the manufactured article;
   at least one of a metrology assessment unit and a subsurface defect detection unit in data communication with the three-dimensional model correction unit and receiving the detailed three-dimensional model data therefrom, the at least one of the metrology assessment unit and the subsurface defect detection unit being configured to process the received data and generating article inspection data therefrom.

21. The system of claim 20, further comprising a data display device in data communication with the at least one of the metrology assessment unit and the subsurface defect detection unit and displaying the article inspection data.

22. The system of claim 20, further comprising an article sorting unit in data communication with the at least one of the metrology assessment unit and the subsurface defect detection unit and configured to process the article inspection data and sort the article based on the processed article inspection data.

23. The system of claim 20, wherein the radiographic image acquisition device includes at least one X-ray source and at least one corresponding X-ray sensor.

24. The system of claim 20, further comprising a surface scanner acquiring a surface profile of the article as relative movement occurs between the article and the surface scanner.

* * * * *